United States Patent
Van Elburg et al.

(10) Patent No.: US 11,433,640 B2
(45) Date of Patent: Sep. 6, 2022

(54) HIGH PERFORMANCE FIBERS COMPOSITE SHEET

(71) Applicant: DSM IP ASSETS B.V., Heerlen (NL)

(72) Inventors: Johann Van Elburg, Echt (NL); Harm Van Der Werff, Echt (NL); Roelof Marissen, Echt (NL); Ulrich Heisserer, Echt (NL); Raul Marcelino Perez Graterol, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 16/956,094

(22) PCT Filed: Dec. 17, 2018

(86) PCT No.: PCT/EP2018/085264
§ 371 (c)(1),
(2) Date: Jun. 19, 2020

(87) PCT Pub. No.: WO2019/121545
PCT Pub. Date: Jun. 27, 2019

(65) Prior Publication Data
US 2021/0114340 A1   Apr. 22, 2021

Related U.S. Application Data

(60) Provisional application No. 62/609,655, filed on Dec. 22, 2017.

(30) Foreign Application Priority Data

Jan. 25, 2018 (EP) .................................. 18153429

(51) Int. Cl.
*B32B 5/26* (2006.01)
*B32B 5/12* (2006.01)
(Continued)

(52) U.S. Cl.
CPC .................. *B32B 5/26* (2013.01); *B32B 5/12* (2013.01); *B32B 27/12* (2013.01); *B32B 27/32* (2013.01);
(Continued)

(58) Field of Classification Search
CPC .............. F41H 5/0485; B32B 2571/02; B32B 2307/718
See application file for complete search history.

(56) References Cited

U.S. PATENT DOCUMENTS

| | | | | |
|---|---|---|---|---|
| 4,173,669 A | * | 11/1979 | Ashida ................... | C03C 17/32 428/34.7 |
| 6,000,055 A | * | 12/1999 | Citterio ................... | B32B 5/26 2/2.5 |

(Continued)

FOREIGN PATENT DOCUMENTS

| | | |
|---|---|---|
| JP | 2007-160587 | 6/2007 |
| JP | 2007-162151 | 6/2007 |
| WO | 2017/060469 | 4/2017 |

OTHER PUBLICATIONS

"Surlyn 1601 Ionomer", Aug. 2019, The Dow Chemical Company, https://www.dow.com/en-us/document-viewer.html?ramdomVar=4536024408013343261&docPath=/content/dam/dcc/documents/en-us/productdatasheet/914/914-26601-01-surlyn-1601-ionomer-tds.pdf (Year: 2019).*

(Continued)

*Primary Examiner* — Jasper Saberi
(74) *Attorney, Agent, or Firm* — Nixon & Vanderhye P.C.

(57) ABSTRACT

The invention relates to a composite sheet comprising at least two adjacent fibrous monolayers of unidirectionally aligned high tenacity polyethylene fibers, whereby the direction of orientation between the polyethylene fibers of said two fibrous layers differs by at least 80° and up to 90°, the fibers having a tenacity of at least 1.5 N/tex, said fibers being (Continued)

in a matrix comprising a homopolymer or copolymer of ethylene and wherein said homopolymer or copolymer of ethylene has a density as measured according to ISO1183 of between 870 to 980 kg/m$^3$, said composite sheet having an areal density of between 50 and 500 g/m$^2$ wherein the composite sheet has an areal density normalized in-plane shear force measured at 25° C. evaluated according to the bias extension test method of at least 0.40 N·m$^2$·g-1 at 10 mm clamp displacement.

14 Claims, 5 Drawing Sheets

(51) Int. Cl.
| | | |
|---|---|---|
| C08F 210/02 | (2006.01) |
| F41H 5/04 | (2006.01) |
| B32B 27/12 | (2006.01) |
| B32B 27/32 | (2006.01) |

(52) U.S. Cl.
CPC ......... *C08F 210/02* (2013.01); *F41H 5/0485* (2013.01); *B32B 2260/023* (2013.01); *B32B 2260/046* (2013.01); *B32B 2262/0253* (2013.01); *B32B 2307/542* (2013.01); *B32B 2307/546* (2013.01); *B32B 2307/718* (2013.01); *B32B 2307/72* (2013.01); *B32B 2307/734* (2013.01); *B32B 2571/02* (2013.01)

(56) References Cited

U.S. PATENT DOCUMENTS

| | | | | |
|---|---|---|---|---|
| 2010/0064404 A1* | 3/2010 | Es Van | ................ | F41H 5/0485 |
| | | | | 2/2.5 |
| 2015/0135937 A1* | 5/2015 | Bader | .................... | B32B 37/26 |
| | | | | 89/36.02 |
| 2016/0326690 A1* | 11/2016 | Rozant | .................. | B32B 27/40 |

OTHER PUBLICATIONS

"Properties of Ionomers", 2017, polylmerdatabase.com, https://polymerdatabase.com/polymer%20classes/Ionomers.html (Year: 2017).*
International Search Report for PCT/EP2018/085264 dated Mar. 6, 2019, 6 pages.
Written Opinion of the ISA for PCT/EP2018/085264 dated Mar. 6, 2019, 9 pages.

* cited by examiner

HIGH PERFORMANCE FIBERS COMPOSITE SHEET

This application is the U.S. national phase of International Application No. PCT/EP2018/085264 filed Dec. 17, 2018 which designated the U.S. and claims priority to U.S. Provisional Patent Application No. 62/609,655 filed Dec. 22, 2017, and EP Patent Application No. 18153429.8 filed Jan. 25, 2018, the entire contents of each of which are hereby incorporated by reference.

The present invention concerns a composite sheet comprising high tenacity polyethylene fibers and a polymeric resin, a ballistic resistant article comprising such a composite sheet and a method for producing such a composite sheet. These composite sheets are amongst others especially adapted to facilitate the manufacture of ballistic resistant articles, amongst which molded ballistic articles for example for vehicle protection, combat helmets, or inserts.

Composite materials comprising fibrous monolayers of unidirectionally aligned high tenacity polyethylene fibers with a tenacity of at least 2 N/tex, whereby the direction of orientation between the polyethylene fibers of different layers is about 90°, said fibers being in a matrix comprising a polymeric resin are known from U.S. Pat. Nos. 4,623,574, 5,766,725, 7,211,291, 8,999,866 and more recently WO 2017060469. WO 2017060469 discloses the manufacture of ballistic resistant sheets by cross plying and stacking a plurality of monolayers comprising unidirectionally aligned extended chain polyethylene fibers and a matrix material, followed by pressing the cross-plied and stacked monolayers into a sheet. The Examples of WO 2017060469 mention the production of sheets with ethylene copolymers as matrix of the unidirectionally aligned high strength polyethylene fibers. A plurality of the thus obtained unidirectional monolayers was stacked whereby the fiber direction in a monolayer is perpendicular to the fiber direction in an adjacent monolayer. The obtained stack was pressed, followed by cooling to provide a molded ballistic article.

There is continuous drive towards improved ballistic resistant articles. Not only is the imminent penetration resistance (or bullet stopping ability) important, but also the integrity of the molded ballistic article in extreme service, such as vehicle or even helicopter armor plates which are repeatedly subjected to severe temperature fluctuations. Thermal shock tests measure the dimensional changes of ballistic panels which are exposed to extreme rapid temperature changes and simulate long term performance of panels in extreme service.

Furthermore, there is also a continuous drive towards increasing the quality and consistence of molded ballistic articles during the production process. It was observed that typically improved generations of ballistic sheets become more demanding on handling and process control during the manufacture of molded ballistic resistant articles made therefrom, requiring amongst others long and accurately followed compression processes. Typical quality issues encountered during manufacturing of molded ballistic resistant articles are displacement of sheets during the process or the presence of undesired bubbles in the molded article immediately or days after manufacturing. Such imperfections in the molded articles represent aesthetic but also performance defects.

An aim of the present invention is to provide a composite sheet, a method of manufacturing a molded ballistic resistant article comprising said sheet and articles made thereof, wherein the sheets at least partly improves one or more of the above-mentioned properties.

The present inventors have found a composite sheet with improved processing into molded ballistic resistant articles, adding robustness to said process while simultaneously showing high ballistic performance. It was found that pressing conditions could be substantially varied and/or simplified while obtaining high quality, defect free ballistic panels. In addition, it was observed that the dimensional stability of the molded ballistic resistant articles upon exposure to extreme rapid temperature changes may be substantially improved.

Accordingly, one embodiment of the present invention provides a composite sheet comprising at least two adjacent fibrous monolayers of unidirectionally aligned high tenacity polyethylene fibers, whereby the direction of orientation between the polyethylene fibers of said two fibrous monolayers differs by at least 80° and up to 90°, the fibers having a tenacity of at least 1.5 N/tex, said fibers being in a matrix comprising a homopolymer or copolymer of ethylene and wherein said homopolymer or copolymer of ethylene has a density as measured according to ISO1183 of between 870 to 980 kg/m$^3$, said composite sheet having an areal density of between 50 and 500 g/m$^2$ wherein the composite sheet has a force normalized by the composite sheet areal density measured at 25° C. evaluated according to the method "bias extension test" described in the methods section of at least 0.40 N·m$^2$·g$^{-1}$ at 10 mm clamp displacement.

The present inventors have discovered that composite sheets according to the invention enable a more robust production process for panels comprising such sheets. The inventors have especially identified that when stacking and compression molding the herein provided inventive sheets, the therewith produced panels are of higher consistency and quality as compared to panels made with composite sheets known to date. Furthermore, the production process employing the inventive sheets proves to be more robust in respect of stacking accuracy, compaction conditions (temperature, pressure) and cycle times. With the present composite sheets, high quality panels could be produced, at a higher rate and with less discard. Especially the presence of gaseous inclusions in the compacted panels, sometimes referred to as bubbles, blebs or blisters, imminently after the compaction process, during storage or in temperature shock testing was substantially reduced, mostly absent. Such improvement as achieved by the present inventive composite sheets can be identified by several techniques, amongst which X-ray, ultrasound and tabbing test but also thickness measurements before and after temperature shock treatment.

Therefore, a further embodiment of the present invention concerns compaction molded articles, preferably ballistic resistant article, comprising the composite sheets of the invention. Preferably the ballistic resistant article is a compression molded panel comprises at least 10, preferably at least 15 and more preferably at least 20 composite sheets according to the invention.

The inventors now identified that there is a relation between the bias extension shear properties of composite sheets of non-woven fibrous structures and the performance of compression moulded articles made thereof.

In one embodiment of the present invention, the composite sheet according to the invention containing cross-plied fibrous monolayers of unidirectionally aligned high tenacity polyethylene fibers has a force (in-plane shear force) normalized by the composite sheet areal density measured at 25° C. evaluated according to the method "bias extension test" of at least 0.40 N·m$^2$·g$^{-1}$ at 10 mm clamp displacement, preferably greater than 0.50 N·m$^2$·g$^{-1}$, more preferably greater than 0.60 N·m$^2$·g$^{-1}$, more preferably greater than 0.70 N·m²·g⁻¹, even more preferably greater than 0.80 N·m²·g⁻¹, yet more preferably greater than 0.90 N·m²·g⁻¹ and most preferably greater than 1.00 N·m²·g⁻¹ at 10 mm extension (clamp movement). The inventors identified that the sheets are especially suited to make compression moulded articles thereof. An increased robustness of the moulding process with such inventive sheets was observed, not only for the manufacture of flat panels but also three dimensionally shaped products such as radomes and helmet shells. For example moulded articles could be obtained that showed less to none defects due to bubbling or displacement of the sheets or its monolayers during the compaction process.

Typically, a composite sheet has an in-plane shear force normalized by composite sheet areal density measured at 25° C. and clamp displacement of 10 mm according to the bias extension test described in the method section, of lower than 5.0 N·m²·g⁻¹, preferably lower than 3.0 N·m²·g⁻¹, more preferably lower than 2.0 N·m²·g⁻¹ and most preferably lower than 1.5 N·m²·g⁻¹.

In a preferred embodiment of the invention the composite sheet has an in-plane shear force normalized by composite sheet areal density measured at 110° C. and clamp displacement of 10 mm according to the bias extension test described in the method section, lower than 0.20 N·m²·g⁻¹, preferably lower than 0.10 N·m²·g⁻¹, more preferably lower than 0.08 N·m²·g⁻¹ and most preferably lower than 0.06 N·m²·g⁻¹. The inventors identified that sheets with such lower in-plane shear force were especially convenient to compression mold both for flat but especially for double curved objects, requiring lower compression temperatures and shorter pressing times.

Typically the composite sheet has an in-plane shear force normalized by composite sheet areal density measured at 110° C. and clamp displacement of 10 mm according to the bias extension test described in the method section, of at least 0.01 N·m²·g⁻¹, preferably at least 0.03 N·m²·g⁻¹, more preferably at least 0.04 N·m²·g⁻¹ and most preferably at least 0.05 N·m²·g⁻¹.

A further unique characteristic of the inventive composite sheets is the secant stiffness of the composite sheet at low elongation, such as an elongation of up to about 1%. Therefor a further preferred embodiment of the invention concerns composite sheets with an in-plane shear secant stiffness normalized by composite sheet areal density at 1% longitudinal deformation of at least 30 N·m²·g⁻¹, preferably at least 40 N·m²·g⁻¹, more preferably at least 50 N·m²·g⁻¹, and most preferably at least 60 N·m²·g⁻¹, the in-plane shear secant stiffness being measured at 25° C. according to the bias extension test secant stiffness as described in the method section. A higher in-plane shear modulus at 25° C. of the composite sheet may provide moulded articles with superior mechanical properties against amongst other blunt impact and low speed deformations.

Typically, an in-plane shear secant stiffness normalized by composite sheet areal density at 1% longitudinal deformation is less than 200 N·m²·g⁻¹, preferably less than 150 N·m²·g⁻¹, more preferably less than 100 N·m²·g⁻¹, the in-plane shear secant stiffness being measured at 25° C. according to the bias extension test secant stiffness as described in the method section.

In a yet further preferred embodiment of the invention, the composite sheet has an in-plane secant stiffness normalized by the sheet areal density at 1% longitudinal deformation of less than 7.0 N·m²·g⁻¹, preferably less than 5.0 N·m²·g⁻¹ and more preferably of less than 3.0 N·m²·g⁻¹, measured at 110° C. according to the bias extension test secant stiffness as described in the method section. The inventors identified that sheets with such combination of high shear stiffness at 25° C. and low in-plane shear stiffness at elevated temperature sheets for are especially suitable for compression moulding ballistic articles with substantially smooth surfaces and high form stability.

Typically, the composite sheet has an in-plane secant stiffness normalized by the sheet areal density at 1% longitudinal deformation of at least 0.5 N·m²·g⁻¹, preferably at least 1.0 N·m²·g⁻¹ and more preferably at least 1.5 N·m²·g⁻¹, measured at 110° C. according to the bias extension test secant stiffness as described in the method section.

By fiber is herein understood an elongated body, the length dimension of which is much greater than the transverse dimensions of width and thickness. Accordingly, the term fiber includes filament, ribbon, strip, band, tape, and the like having regular or irregular cross-sections. The fiber may have continuous lengths, known in the art as filament or continuous filament, or discontinuous lengths, known in the art as staple fibers. A yarn for the purpose of the invention is an elongated body containing many individual fibers. By individual fiber is herein understood the fiber as such. Preferably the high tenacity polyethylene fibers of the present invention are tapes, filaments or staple fibers.

In the context of the present invention high tenacity polyethylene fibers are understood to be polyethylene fibers with a tenacity of at least 1.5 N/tex, more preferably at least 1.8 N/tex, more preferably at least 2.0 N/tex, even more preferably at least 2.5 N/tex and most preferably at least 3.5 N/tex. Preferred polyethylene is high molecular weight (HMWPE) or ultrahigh molecular weight polyethylene (UHMWPE). Best results were obtained when the high tenacity polyethylene fibers comprise ultra-high molecular weight polyethylene (UHMWPE) and have a tenacity of at least 2.0 N/tex, more preferably at least 3.5 N/tex. The inventors observed that for HMWPE and UHMWPE the best ballistic performances could be achieved.

The polyethylene (PE) present in the fibers may be linear or branched, whereby linear polyethylene is preferred. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR. The linear polyethylene may further contain up to 5 mol % of one or more other alkenes that are copolymerizable therewith, such as propene, 1-butene, 1-pentene, 4-methylpentene, 1-hexene and/or 1-octene.

The PE is preferably of high molecular weight with an intrinsic viscosity (IV) of at least 2 dl/g; more preferably of at least 4 dl/g, most preferably of at least 8 dl/g. Such polyethylene with IV exceeding 4 dl/g are also referred to as ultra-high molecular weight polyethylene (UHMWPE). Intrinsic viscosity is a measure for molecular weight that can more easily be determined than actual molar mass parameters like number and weight average molecular weights (Mn and Mw).

The high tenacity fibers present in the composite sheets according to the invention may be obtained by various processes, for example by a melt spinning process, a gel spinning process or a solid-state powder compaction process.

One preferred method for the production of the fibers is a solid state powder process comprising the feeding the polyethylene as a powder between a combination of endless belts, compression-molding the polymeric powder at a temperature below the melting point thereof and rolling the resultant compression-molded polymer followed by solid state drawing. Such a method is for instance described in U.S. Pat. No. 5,091,133, which is incorporated herein by reference. If desired, prior to feeding and compression-molding the polymer powder, the polymer powder may be mixed with a suitable liquid compound having a boiling point higher than the melting point of said polymer. Compression molding may also be carried out by temporarily retaining the polymer powder between the endless belts while conveying them. This may for instance be done by providing pressing platens and/or rollers in connection with the endless belts.

Another preferred method for the production of the fibers used in the invention comprises feeding the polyethylene to an extruder, extruding a molded article at a temperature above the melting point thereof and drawing the extruded fibers below its melting temperature. If desired, prior to feeding the polymer to the extruder, the polymer may be mixed with a suitable liquid compound, for instance to form a gel, such as is preferably the case when using ultra high molecular weight polyethylene.

In yet another method the fibers used in the invention are prepared by a gel spinning process. A suitable gel spinning process is described in for example GB-A-2042414, GB-A-2051667, EP 0205960 A and WO 01/73173 A1. In short, the gel spinning process comprises preparing a solution of a polyethylene of high intrinsic viscosity, extruding the solution into a solution-fiber at a temperature above the dissolving temperature, cooling down the solution-fiber below the gelling temperature, thereby at least partly gelling the polyethylene of the fiber, and drawing the fiber before, during and/or after at least partial removal of the solvent.

In the described methods to prepare high tenacity fibers drawing, preferably uniaxial drawing, of the produced fibers may be carried out by means known in the art. Such means comprise extrusion stretching and tensile stretching on suitable drawing units. To attain increased mechanical tensile strength and stiffness, drawing may be carried out in multiple steps.

In case of the preferred UHMWPE fibers, drawing is typically carried out uniaxially in a number of drawing steps. The first drawing step may for instance comprise drawing to a stretch factor (also called draw ratio) of at least 1.5, preferably at least 3.0. Multiple drawing may typically result in a stretch factor of up to 9 for drawing temperatures up to 120° C., a stretch factor of up to 25 for drawing temperatures up to 140° C., and a stretch factor of 50 or above for drawing temperatures up to and above 150° C. By multiple drawing at increasing temperatures, stretch factors of about 50 and more may be reached. This results in high tenacity polyethylene fibers, whereby for ultrahigh molecular weight polyethylene, tensile strengths of 1.5 N/tex to 3 N/tex and more may be obtained.

The composite sheet of the invention comprises a matrix comprising a homopolymer or copolymer of ethylene. The matrix may comprise further polymeric components as well as customary additives such as plasticizers, surfactants, fillers, stabilizer, colorant, etc.

The amount of homopolymer or copolymer of ethylene present in the composite sheet according to the invention may vary within wide ranges and will especially depend upon the application of the sheet as well as the nature of the polyethylene fibers present in the monolayers. Typically the amount of homopolymer or copolymer of ethylene present in the composite sheet is at least 2 wt %, preferably at least 5 wt %. In a preferred embodiment said concentration of homopolymer or copolymer of ethylene is at most 25 wt %, preferably at most 20 wt %, even more preferably at most 18 wt % and most preferably at most 16 wt %. In another preferred embodiment the amount of the homopolymer or copolymer of ethylene is between 2 and 25 wt %, preferably between 5 and 20 wt %, most preferably between 8 and 18 wt %, whereby the weight percentage is the weight of homopolymer or copolymer of ethylene in the total weight of the composite sheet. In a further preferred embodiment the amount of homopolymer or copolymer of ethylene is at least 15 wt %, preferably at least 18 wt % and even more preferably at least 20 wt %. In another preferred embodiment the amount of the homopolymer or copolymer of ethylene is between 10 and 50 wt %, preferably between 15 and 40 wt %, most preferably between 18 wt % and 30 wt %.

In the context of the present invention, the homopolymer or copolymer of ethylene may also respectively be referred to as polyethylene and ethylene copolymers, jointly or individually herein referred to as polyethylene resin. It may comprise the various forms of polyethylene, ethylene-propylene co-polymers, other ethylene copolymers with co-monomers such as 1-butene, isobutylene, as well as with hetero atom containing monomers such unsaturated carboxylic acids or derivatives thereof like acrylic acid, methacrylic acid, vinyl acetate, maleic anhydride, ethyl acrylate, methyl acrylate. In the absence of co-monomer in the polyethylene resin, a wide variety of polyethylene or polypropylene may be used amongst which linear low density polyethylene (LLDPE), very low density polyethylene (VLDPE), low density polyethylene (LDPE), or high density polyethylene (HDPE).

In a preferred embodiment of the invention the polyethylene resin is a copolymer of ethylene comprising at least 90 mol % of monomeric units derived from ethylene, preferably at least 92 mol %, more preferably at least 93 mol %, even more preferably at least 94 mol % and most preferably at least 95 mol % of ethylene derived monomeric units. Preferably the amount of monomeric units derived from ethylene is at most 99 mol %, more preferably at most 98 mol %.

Preferably the polyethylene resin may be a functionalized polyethylene or ethylene copolymer. Such functionalized polymers are often referred to as functional copolymers or grafted polymers, whereby the grafting refers to the chemical modification of the polymer backbone mainly with ethylenically unsaturated monomers comprising heteroatoms and whereas functional copolymers refer to the copolymerization of ethylene with ethylenically unsaturated monomers comprising heteroatoms. Preferably the ethylenically unsaturated monomer comprises oxygen and/or nitrogen atoms. Most preferably the ethylenically unsaturated monomer comprises a carboxylic acid group or derivatives thereof resulting in an acylated polymer, specifically an acetylated polyethylene. Preferably, the carboxylic reactants are selected from the group consisting of acrylic, methacrylic, cinnamic, crotonic, and maleic, fumaric, and itaconic reactants. Said functionalized polymers typically comprise between 1 and 8 mol % of carboxylic reactant. The presence of such functionalization in the resin may substantially enhance the dispersability of the resin and/or allow a reduction of further additives present for that purpose such as surfactants.

In the case the polyethylene resin is a polyethylene functionalized with carboxylic acid groups or derivatives thereof, it is a preferred embodiment of the invention that the carboxylic acid groups are at least partially neutralized. Herein neutralized or neutralization refers to the fact that the carboxylic acid group is present as a carboxylate salt, with a corresponding cationic counterion. Such at least partially neutralized acidic polymers are also referred to as ionomers. The inventors identified that the presence of an at least partially neutralized carboxylic acid functionality in the polyethylene resin further improved the robustness of the manufacturing process of compression molded articles from the inventive sheets. It is yet unclear to the inventors whether such improvement can be accounted to the more complex polymer rheology, the increase of polarity and/or any other change of physical property of the polyethylene resin.

In a further preferred embodiment of the invention, the polyethylene resin is an at least partially neutralized copolymer of ethylene further comprising monomeric units derived from at least one unsaturated carboxylic acid. Such polyethylene resins show further increased in-plane shear strength of the inventive sheets. Whereas the molar ratio of monomeric units derived from ethylene and the unsaturated carboxylic acid monomer may vary widely, the inventors identified that polyethylene resins with increased levels of ethylene monomeric units are favored since they further improve the performance of the sheets and compression molded articles of the invention at elevated temperatures, while still providing easily processable polyethylene resins during manufacturing. Therefore a preferred embodiment of the invention is a composite sheet wherein the polyethylene resin is an at least partially neutralized copolymer of ethylene with at least one unsaturated carboxylic acid comonomer, the copolymer of ethylene comprising at least 90 mol % of monomeric units derived from ethylene, preferably at least 92 mol %, more preferably at least 93 mol %, even more preferably at least 94 mol % and most preferably at least 95 mol % of ethylene derived monomeric units. Preferably the amount of monomeric units derived from ethylene is at most 99 mol %, more preferably at most 98 mol %.

In a further preferred embodiment of the present invention the at least one unsaturated carboxylic acid comonomer present in the at least partially neutralized copolymer of ethylene is acrylic acid or methacrylic acid or a combination thereof. In a yet preferred embodiment the copolymer of ethylene is ethylene acrylic acid copolymer (EAA) or ethylene methacrylic acid copolymer (EMA) or mixtures thereof. The inventors identified that the ionomeric derivatives of these polymers provide a set of processing conditions suitable for the processing of the fibrous monolayers of high tenacity polyethylene fibers. During said processing conditions, the concerned polyethylene resins become melt processable without a substantial loss of viscosity or increased stickiness to parts of the equipment used.

The polyethylene resin may be neutralized by a large variety of cationic species, such as atoms bearing at least one positive charge but also molecular structures, such as polymers, bearing 2 or more positive charges. Preferably the carboxylic acid comprises as neutralizing ion a cation selected from the group consisting of $Na^+$, $K^+$, $Li^+$, $Ag^+$, $Cu^+$, $Cu^{2+}$, $Be^+$, $Mg^{2+}$, $Ca^{2+}$, $Sn^{2+}$, $Sn^{4+}$, $Fe^{2+}$, $Fe^{3+}$, $Zn^{2+}$, $Al^{3+}$, $NH_4^+$ and combinations thereof. It was observed that with these preferred cations, the viscosity and other physical properties of the polyethylene resin can be controlled to the processing conditions to prepare and/or use the composite sheet of the invention. Especially preferred cations are $Na^+$, $K^+$, $Li^+$, $Mg^{2+}$, $Ca^{2+}$, $Sn^{2+}$, $Zn^{2+}$, $Al^{3+}$ and mixtures thereof. These cations provide polyethylene resins with optimized processability at temperatures in the range of 80 to 120° C.

In a preferred embodiment of the invention, the polyethylene resin, especially the at least partially neutralized copolymer of ethylene with at least one unsaturated carboxylic acid comonomer, comprises at least two distinct neutralizing ions.

In a yet preferred embodiment of the invention the polyethylene resin, especially the at least partially neutralized copolymer of ethylene further comprising monomeric units derived from at least one unsaturated carboxylic acid, comprises between 1.0 and 30 mol % of ion $NH_4^+$ as the neutralizing ion. The remainder of the neutralizing ions may be any one or combinations of the preferred cations described above. Preferably the amount of ammonia cation ($NH_4^+$) is between 2.0 and 25 mol %, and more preferably between 5.0 and 20 mol %. By mol % is herein understood as the molar ratio of the concerned cation to the total of cations present as neutralizing ion in the polyethylene resin. The inventors observed that the presence of ammonia cations in the above preferred ranges provide polyethylene resins which are easily melt processable under commercial processing conditions of the inventive sheets and compression molded articles made thereof. More preferably, the polyethylene resin especially the at least partially neutralized copolymer of ethylene further comprising monomeric units derived from at least one unsaturated carboxylic acid, comprises between 70 and 99 mol %, more preferably 75 and 98 mol %, and even more preferably 80 and 95 mol % of neutralizing ions selected from the group consisting of $Na^+$, $K^+$, $Li^+$, $Mg^{2+}$, $Ca^{2+}$, $Sn^{2+}$, $Zn^{2+}$, $Al^{3+}$ and mixtures thereof. The inventors observed that above preferred mixtures and ratios provide composite sheets with unmet processing robustness, especially with regards to the formation of internal defects by bubbling.

By at least partly neutralize is herein understood that at least some of the carboxyl groups are present as carboxylate salts. Preferably the overall level of neutralization is at least 10 mol %, preferably at least 20 mol % and more preferably at least 30 mol %, whereby the level of neutralization in mol % is expressing the moles of carboxylate salts divided by the moles of carboxylic acid and carboxylate salt present in the polyethylene resin, especially the at least partially neutralized copolymer of ethylene further comprising monomeric units derived from at least one unsaturated carboxylic acid. The maximum level of neutralization is 100 mol %, referring to a polyethylene resin wherein no measurable amount of carboxylic acid groups is present in a protonated form. In a preferred embodiment, the degree of neutralization of the carboxylic acid groups of the polyethylene resin, especially the copolymer, is between 50 and 100 mol %, more preferably between 60 and 99 mol %.

The homopolymer or copolymer of ethylene present in the matrix has a density as measured according to ISO1183 in the range from 870 to 980 kg/m³, preferably from 890 to 970 kg/m³, more preferably from 910 to 960 kg/m³. The inventors identified that polyethylene resins with densities within said preferred ranges provide an improved compatibility with the other components of the composite sheet. In case of an at least partially neutralized copolymer of ethylene with carboxylic acid monomeric units, the density is preferably in the range of from 910 to 970 kg/m³, preferably from 920 to 970 kg/m³, more preferably from 930 to 960 kg/m³, whereby the density may depend both on polymer composition and degree of neutralization.

The homopolymer or copolymer of ethylene preferably is a semi-crystalline polymer having a peak melting temperature in the range from 40 to 140° C. and a heat of fusion of at least 50 J/g, measured in accordance with ASTM E793 and ASTM E794, considering the second heating curve at a heating rate of 10 K/min, on a dry sample. In a preferred embodiment of the present invention the homopolymer or copolymer of ethylene has a heat of fusion of at least 75 J/g, preferably at least 100 J/g, more preferably at least 125 J/g, even more preferably at least 150 J/g and most preferably at least 175 J/g. The inventors surprisingly found that with the increased heat of fusion the composite sheet, when stacked to form a ballistic article, showed improved ballistic performance such as back face deformation. The heat of fusion of the homopolymer or copolymer of ethylene is not specifically limited by an upper value, other than the theoretical maximum heat of fusion for a fully crystalline polyethylene of about 300 J/g. The homopolymer or copolymer of ethylene may have a peak melting temperature in the range from 70 to 140° C., preferably in the range from 80 to 130° C., more preferably in the range from 90 to 120° C. Such preferred peak melting temperatures provide a more robust processing method to produce the composite sheets in that the conditions for drying and/or compaction of the composite sheet do need less attention while composites with good properties are produced. The polyethylene resin and/or the homopolymer or copolymer of ethylene may have more than one peak melting temperatures. In such case at least one of said melting temperatures falls within the above ranges. A second and/or further peak melting temperature of the polyethylene resin may fall within or outside the temperature ranges. Such may for example be the case when the polyethylene resin is a blend of polymers.

The polyethylene resin preferably has a melt flow index of between 0.5 and 50 g/10 min when measured according to ASTM 1238B-13 at a temperature of 190° C. and a weight of 21.6 kg. In a more preferred embodiment, the melt flow index is between 1.0 and 30 and more preferably between 2.0 and 20 g/10 min. The inventors observed that such viscosity range of the polyethylene resin provide the advantage of optimized processing windows, allowing manufacturing of the inventive composite sheets but also the preparation of the molded articles from said inventive composite sheets in an industrial applicable processing window. Too high melt flow index may cause problems with shifting of fibers and/or sheets during processing, due to the too high lubricity of the polyethylene resin. In contrast, a polyethylene resin with a too low melt flow index, i.e. a melt flow index close to zero, is not melt processable and may hamper the mobility and fusing character of the matrix and/or polyethylene resin during the manufacturing process of the composite sheets or compression molded articles made thereof, resulting in an inhomogeneous and/or discontinuous distribution of the polyethylene resin throughout the sheet or article. Hence in a preferred embodiment of the invention, the polyethylene resin is a melt-processable resin. The melt flow index of the polyethylene resins, and especially the above described at least partially neutralized polymers, may be affected by the moisture content of the measured sample. Therefore, in addition to the above mentioned ASTM method, the polyethylene resins needs to be measured in a dried state, which can be achieved by drying the samples in vacuum at 120° C. for at least 12 hours before testing.

A further aspect of the invention concerns the modulus of the polyethylene resin present in the matrix of the composite sheets, which may vary in wide ranges. Nevertheless as yet described, preparation and further processing of the sheets are affected by the properties of the polyethylene resin at room temperature but also in vicinity of the processing temperature, therefor a preferred embodiment of the invention is that the polyethylene resin has a modulus at 25° C. of between 50 MPa and 500 MPa, preferably between 80 and 400 MPa, and more preferably between 100 and 300 MPa and a modulus at 110° C. of between 0.1 and 10 MPa, preferably between 0.2 and 8 MPa and most preferably between 0.4 and 5 MPa, whereby the moduli is determined by Dynamic Mechanical Thermal Analysis (DMTA) on 2 mm thick samples according with ASTM D5026 at a frequency of 1 Hz at a heating rate of 5° C.

Methods to produce the composite sheets according to the invention are generally known in the art as for example described in WO2005066401 and WO2017060469, which are herein included by reference. Most preferably the process comprises applying the matrix in any form, preferably as a solution, more preferably an emulsion, most preferably an aqueous dispersion, of the matrix comprising the polyethylene resin to the fibrous monolayers of the unidirectionally aligned high tenacity polyethylene fibers. The obtained impregnated fibrous layers may be dried and cross-plied to provide the sheets according to the invention. Once the polyethylene resin is applied to the fibers, the impregnated fiber, is at least partially dried. Such drying step involves the removal, e.g. the evaporation of at least a fraction of the solvent or water present. Preferably the majority, more preferably essentially all water is removed during the drying step, optionally in combination with other components present in the impregnated assembled sheet. Typical drying conditions are temperatures of between 40 and 130° C., preferably 50 and 120° C. Typical pressure during the drying process are between 10 and 110 kPa, preferably between 20 and 100 kPa.

The process may comprise a step wherein the composite sheet is heated to a temperature in the range from the melting temperature of the polyethylene resin to 153° C., before, during and/or after the partially drying of the sheet. Preferably, the temperature is at least 2° C., preferably at least 5° C., most preferably at least 10° C. above the peak melting temperature of the polyethylene resin. The upper temperature is at most 153° C., preferably at most 150° C., more preferably at most 145° C. and most preferably at most 140° C. In a preferred embodiment, the heating of the sheet of this step overlaps, more preferably is combined with the drying step. It may prove to be practical to apply a temperature gradient to the impregnated sheet whereby the temperature is raised from about room temperature to the maximum temperature of the heating step over a period of time whereby the impregnated sheet will undergo a continuous process from drying to at least partial melting of the polyethylene resin.

In a further optional step of the process of the invention, the composite sheet is at least partially compacted by applying a pressure. Said pressure may be applied by compression means known in the art, which may amongst others be a calendar, a smoothing unit, a double belt press, or an alternating press. The compression means form a gap through which the layer will be processed. Pressure for compaction generally ranges from 100 kPa to 10 MPa, preferably from 110 to 500 kPa. The compression is preferably performed after at least partially drying the composite sheet, more preferably during or after the optional step of applying a temperature, while the temperature of the sheet is in the range from the melting temperature of the polyethylene resin to 153° C.

The composite sheet of the invention comprises at least two adjacent fibrous monolayers of unidirectionally aligned high tenacity polyethylene fibers. Herewith is understood that the fibers are in a parallel array arrangement also known as unidirectional UD arrangement, which may be obtained by any of a variety of conventional techniques. Such sheets can be comprised in cut resistant garments and also in anti-ballistic products, e.g. ballistic resistant articles, vests, helmets, radomes and tarpaulin. Therefore, the invention also relates to such articles.

A preferred embodiment of the present invention concerns a composite sheet containing more than 70 wt % of high tenacity polyethylene fibers, preferably more than 75 wt % and most preferably more than 80 wt % high tenacity polyethylene fibers, whereby the wt % are expressed as mass of fibers to the total mass of the composite sheet.

In an alternative embodiment, the composite sheet may also comprise further fibers, other than the above high tenacity polyethylene fibers. Herewith are understood high tenacity fibers other than manufactured from polyethylene, such as inorganic fibers like carbon fiber, mineral fibers and glass fibers or organic fibers manufactured from a polymer chosen from the group consisting of polyamides and polyaramides, e.g. poly(p-phenylene terephthalamide) (known as Kevlar®); poly(tetrafluoroethylene) (PTFE); poly{2,6-diimidazo-[4,5b-4',5'e]pyridinylene-1,4(2,5-dihydroxy)phenylene}(known as M5); poly(p-phenylene-2,6-benzobisoxazole) (PBO) (known as Zylon®); liquid crystal polymers (LCP); poly(hexamethyleneadipamide) (known as nylon 6,6), poly(4-aminobutyric acid) (known as nylon 6); polyesters, e.g. poly(ethylene terephthalate), poly(butyleneterephthalate), and poly(1,4 cyclohexylidene dimethylene terephthalate); polyvinyl alcohols; and also polyolefins e.g. homopolymers and copolymers propylene.

In the context of the present invention, the term monolayer refers to a layer of fibers with identical, unidirectional orientation. The term unidirectional monolayer refers to a layer of unidirectionally oriented fibers, i.e. fibers that are essentially oriented in parallel. The composite sheet comprises at least two adjacent unidirectional monolayers the direction of the fibers in a monolayer being rotated with a certain angle with respect to the direction of the fibers in an adjacent monolayer. Said angle is at least 80°, more preferably at least 85° and most preferably the angle is about 90°. In one embodiment of the invention, the composite sheet comprises more than 2 monolayers of unidirectionally aligned fibers, whereby the fiber direction in each monolayer being rotated with respect to the fiber direction in an adjacent monolayer by an angle of at least 80°. Preferably a set of 2, 4, 6, 8 or 10 monolayers may be stacked such that the fiber direction in each monolayer is rotated with respect to the fiber direction in an adjacent monolayer, followed by consolidation of the stack of monolayers to a composite sheet according to the invention, such that the composite sheet contains aligned high tenacity polyethylene fibers in substantially two directions of orientations, also called the 0° and the 90° orientation. Consolidation may be done by the use of pressure and temperature to form a sheet. Pressure for consolidation generally ranges from 1-100 bar while temperature during consolidation typically is in the range from 60 to 140° C.

The composite sheet may furthermore comprise on either or both sides so-called separating films, or cover sheet, being a polymeric film with a thickness of preferably from 1 to 20 micrometer, more preferably from 2 to 10 micrometer. The separating film may comprise polyethylene, especially ultra high molecular weight polyethylene, low density polyethylene, polypropylene, thermoplastic polyester or polycarbonate. Most preferably, biaxially-oriented films made from polyethylene, polypropylene, polyethylene terephthalate or polycarbonate are used as separating films. Preferably separating films are employed in combination with low numbers of monolayers as discussed above, preferably 2, 3 or 4 monolayers.

The weight, or areal density (AD), of the composite sheet of the invention, including the weight of the fibers, matrix and optionally one or two separating films is between 50 and 500 g/m$^2$, sometimes from 60 to 300 g/m$^2$, such as from 80 to 240 g/m$^2$. According to some embodiments. Typical areal densities of the monolayers of high tenacity polyethylene fiber and matrix are in the range of 25 to 200 g/m$^2$, preferably in the range of 30 to 160 g/m$^2$ and most preferably in the range of 40 to 120 g/m$^2$.

The composite sheet of the invention is very suitable for use in soft ballistic articles, such as bullet-resistant vests. An even preferred use of the composite sheet of the invention is in compressed or moulded ballistic resistant articles such as panels and especially curved panels and articles, e.g. inserts, helmets, radomes. The sheets of the invention may be applied in the applications as the main component but also in combination with minor or major amounts of other components like alternative composite sheets. In a preferred embodiment, the ballistic resistant article is a compression molded article comprising at least 10, preferably at least 20 of the inventive composite sheets. It was observed that compression molded articles according to the invention shows less than 2.0%, preferably less than 1.5 and more preferably less than 1.0%, average thickness change when subjected to a repeated temperature shock test cycle between room temperature/−30/110° C./−30/110° C./room temperature whereby the sample is maintained for 5 minutes once they reached said temperatures. Hereby the thickness is averaged over 8 predetermined position on a ballistic panel and compared before and after said treatment.

A preferred field of application of the composite sheet of the invention is in the field of anti-ballistic articles such as armors. The function of an armor is two-fold, it should stop fast projectiles, and it should do so with a minimum deformation or size of the impact dent. It was surprisingly observed that the size of the impact dent is small, if composite sheets made according to the present invention are used in armor. In other words, the back face signature is small. Such armor is especially suitable for combat helmet shells, because they show reduced back face signature on stopping projectiles, thus reducing the probability of physiological trauma on the human skull and brain after being hit by a stopped projectile.

The invention will be further explained by the following examples and comparative experiment, however first the methods used in determining the various parameters useful in defining the present invention are hereinafter presented.

Methods

Dtex: yarn's or filament's titer was measured by weighing 100 meters of yarn or filament, respectively. The dtex of the yarn or filament was calculated by dividing the weight (expressed in milligrams) to 10;

Heat of fusion and peak melting temperature have been measured according to standard DSC methods ASTM E 794 and ASTM E 793 respectively at a heating rate of 10K/min for the second heating curve and performed under nitrogen on a dehydrated sample.

The density of the polyethylene resin is measured according to ISO 1183.

IV: the Intrinsic Viscosity is determined according to method ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration.

Tensile properties: tenacity and elongation at break (or eab) of fibers are defined and determined on monofilament fiber with a procedure in accordance with ISO 5079:1995, using a Textechno's Favimat (tester no. 37074, from Textechno Herbert Stein GmbH & Co. KG, Monchengladbach, Germany) with a nominal gauge length of the fibre of 50 mm, a crosshead speed of 25 mm/min and clamps with standard jaw faces (4*4 mm) manufactured from Plexiglas® of type pneumatic grip. The filament was preloaded with 0.004 N/tex at the speed of 25 mm/min. For calculation of the tenacity the tensile forces measured are divided by the filament linear density (titer); values in GPa are calculated assuming a density of 0.97 g/cm³

Tensile properties of high tenacity polyethylene yarns: tenacity and tensile modulus are defined and determined on multifilament yarns as specified in ASTM D885M, using a nominal gauge length of the fibre of 500 mm, a crosshead speed of 50%/min and Instron 2714 clamps, of type "Fibre Grip D5618C". On the basis of the measured stress-strain curve the modulus is determined as the gradient between 0.3 and 1% strain. For calculation of the tensile modulus and tenacity, the tensile forces measured are divided by the titre, as determined above; values in GPa are calculated assuming a density of 0.97 g/cm³ for the polyethylene fibers.

DMTA measurements of the polyethylene resin are performed on samples with a width of approximately 2 mm, punched out of compressed films of the polyethylene resin. The thickness is measured with a calibrated Heidenhain thickness meter. The dynamic mechanical analyses are carried out in accordance with ASTM D5026 using a RSA-G2 test system from TA Instruments at a frequency of 1 Hz and over a temperature ranging from −130° C. to 250° C. with a heating rate of 5° C./min. During the measurements, the storage modulus (E'), loss modulus (E") and tangent delta (tan δ) are determined as a function of temperature.

Areal density (AD) of a panel or sheet was determined by measuring the weight of a sample of preferably 0.4 m×0.4 m with an error of 0.1 g.

Figure 1:
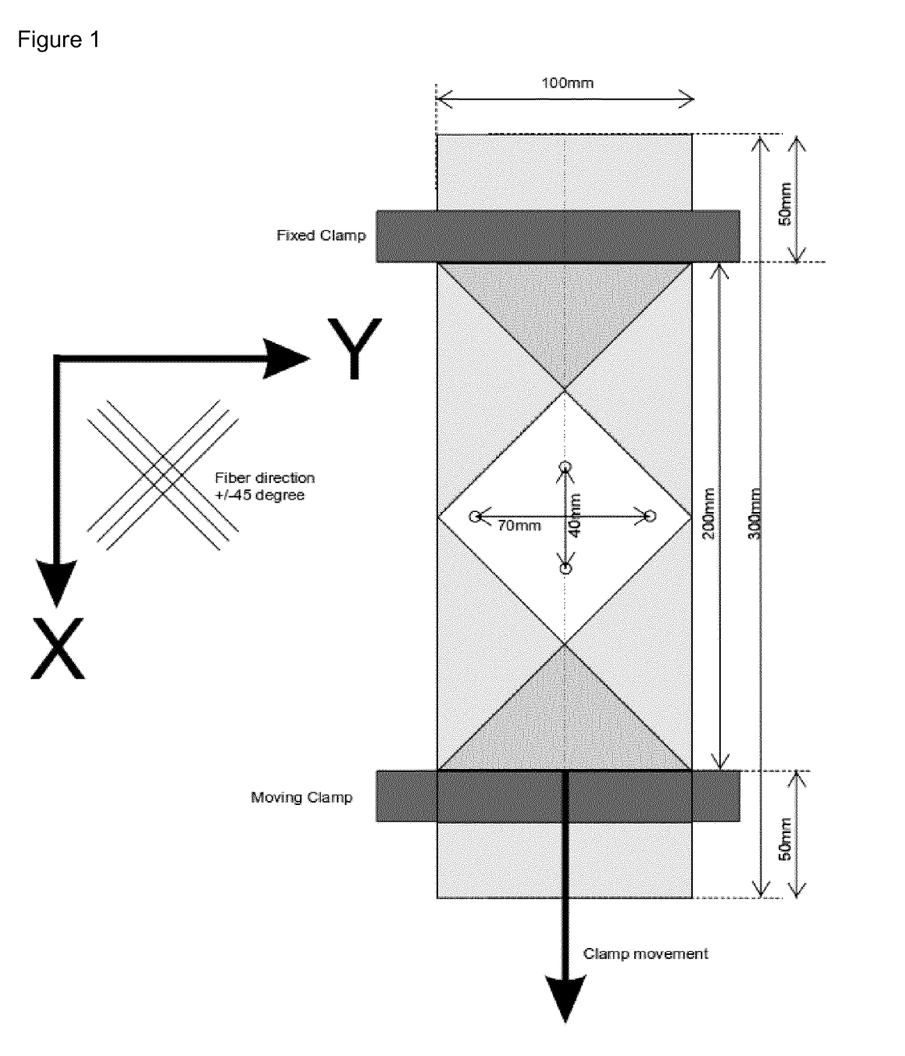
FIG. 1 is a schematic representation of the bias extension test setup showing the sample sheet with a width of 100 mm and length 300 mm. The fiber directions run in +/−45° direction relative to the length direction, X. The sample is clamped with a fixed clamp and a moving clamp whereby the free length between the clamps is 200 mm. Upon testing the moving clamp is displaced downwards, in direction of the arrow, elongating the sample. The force to extend this sample in length direction at a clamp speed of 50 mm/min is sampled at a sufficiently high rate. An overlay of typical plots recorded is presented in FIG. 2.
Figure 2:
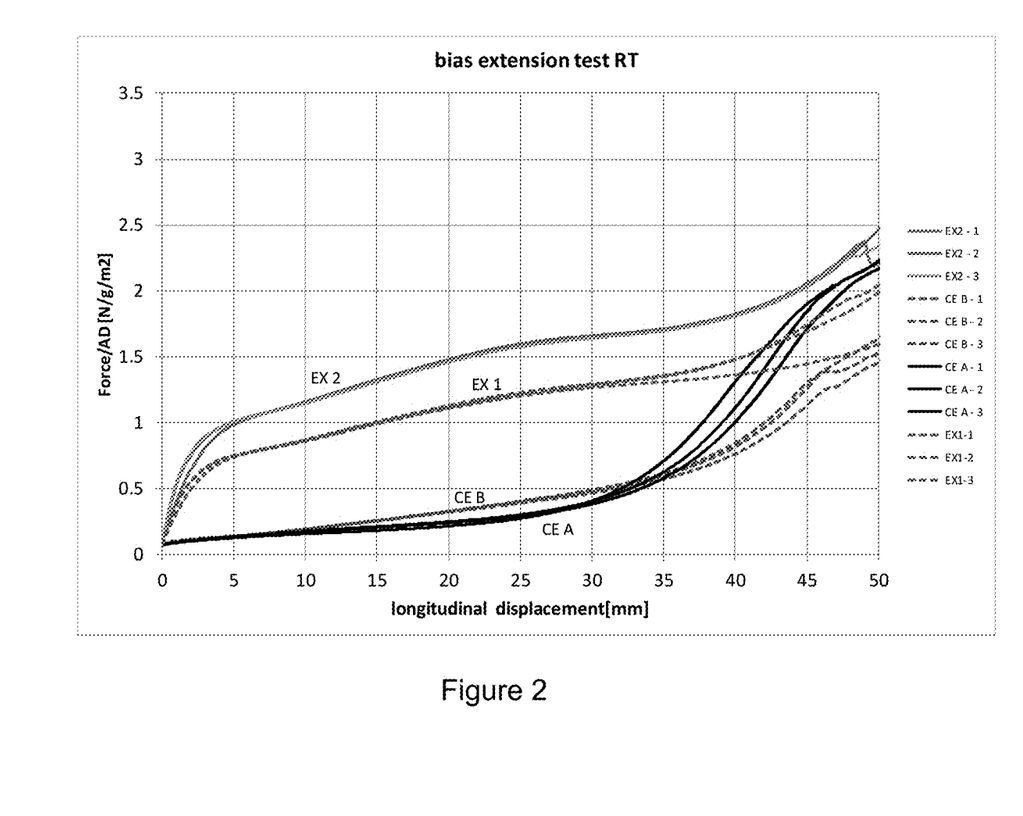
FIG. 2 is an overlay of bias extension test results measured at 25° C. temperature according to the above described method. The extensional force normalized to the areal density of the samples on the y-axis is plotted in N·m²·g⁻¹ against the longitudinal displacement of the test sample in mm. For each of the Examples (EX1 and EX2) and comparative Experiments (CE A and CE B) the plots for 3 individual samples (−1, −2 and −3) are shown.

Bias extension test. The test is a variant of the ASTM D3518 applied to composite sheets. The methodology is reviewed by P. Boisse et al in "The bias-extension test for the analysis of in-plane shear properties of textile composite reinforcements and prepregs: a review", International Journal of Materials Forming, 2017, 10 (4), pp. 473-492, herein included by reference. Boisse identifies this method as a simple experiment to determine in-plane shear properties in view of application of fibrous composites. The specific dimensions used are shown in FIG. 1 with sample width of 100 mm and length 300 mm. Fibers run in +/−45° direction relative to the length direction. The free length between the clamps is 200 mm and care is taken that there is no slip of the sample in the clamps during the test range of interest. One clamp is fixed, the other clamp is displaced in length direction elongating the sample. The force to extend this sample in length direction at a clamp speed of 50 mm/min is measured with a 10 kN load cell at a sufficiently high sampling rate. Recording of displacement and force is started as soon as a pre-load of 10 N is reached, FIG. 2. The test can be carried out at room temperature but also in a temperature chamber at elevated temperatures. Extensional forces are recorded for the clamp displacement. For the force normalized by areal density according to the invention, the force recorded for a displacement of 10 mm is divided by the areal density of the composite sheet.

Figure 3:
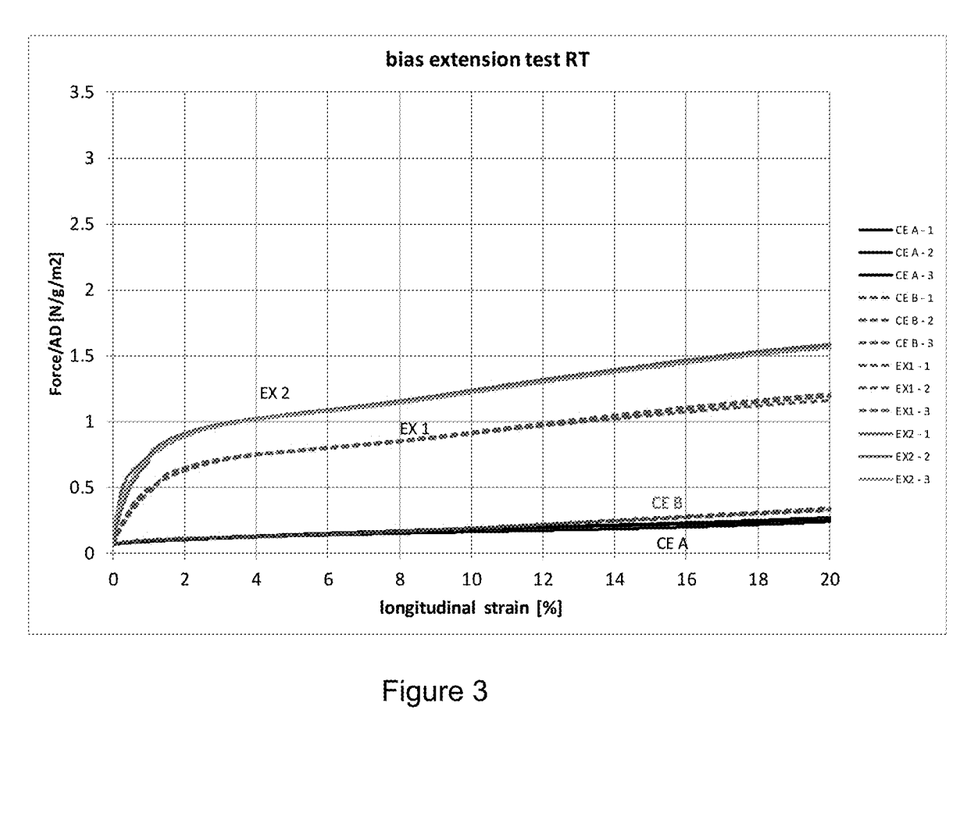
FIG. 3 is an overlay of bias extension test results measured at 25° C. temperature according to the above described method. The extensional force normalized to the areal density of the samples on the y-axis is plotted in N·m²·g⁻¹ against the longitudinal strain of the test sample in percent elongation. For each of the Examples (EX1 and EX2) and comparative Experiments (CE A and CE B) the plots for 3 individual samples (−1, −2 and −3) are shown.
Figure 4:
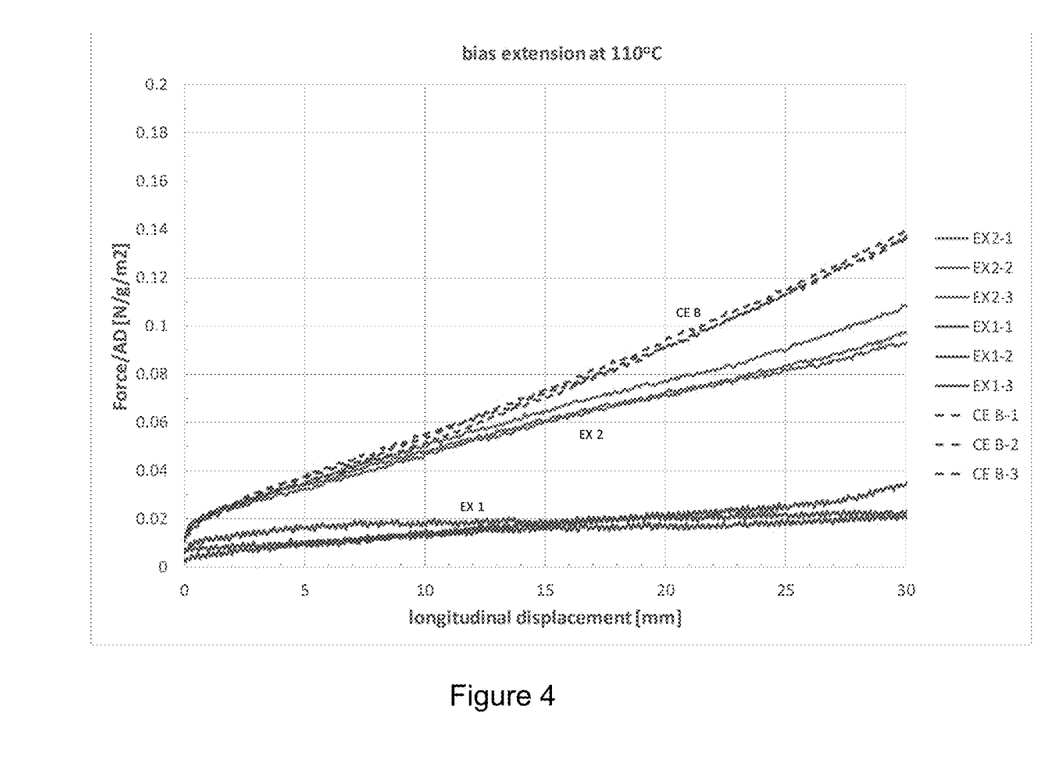
FIG. 4 is an overlay of bias extension test results measured at 110° C. temperature according to the above described method. The extensional force normalized to the areal density of the samples on the y-axis is plotted in N·m²·g⁻¹ against the longitudinal displacement of the test sample in mm. For each of the Examples (EX1 and EX2) and comparative Experiment (CE B) the plots for 3 individual samples (−1, −2 and −3) are shown.
Figure 5:
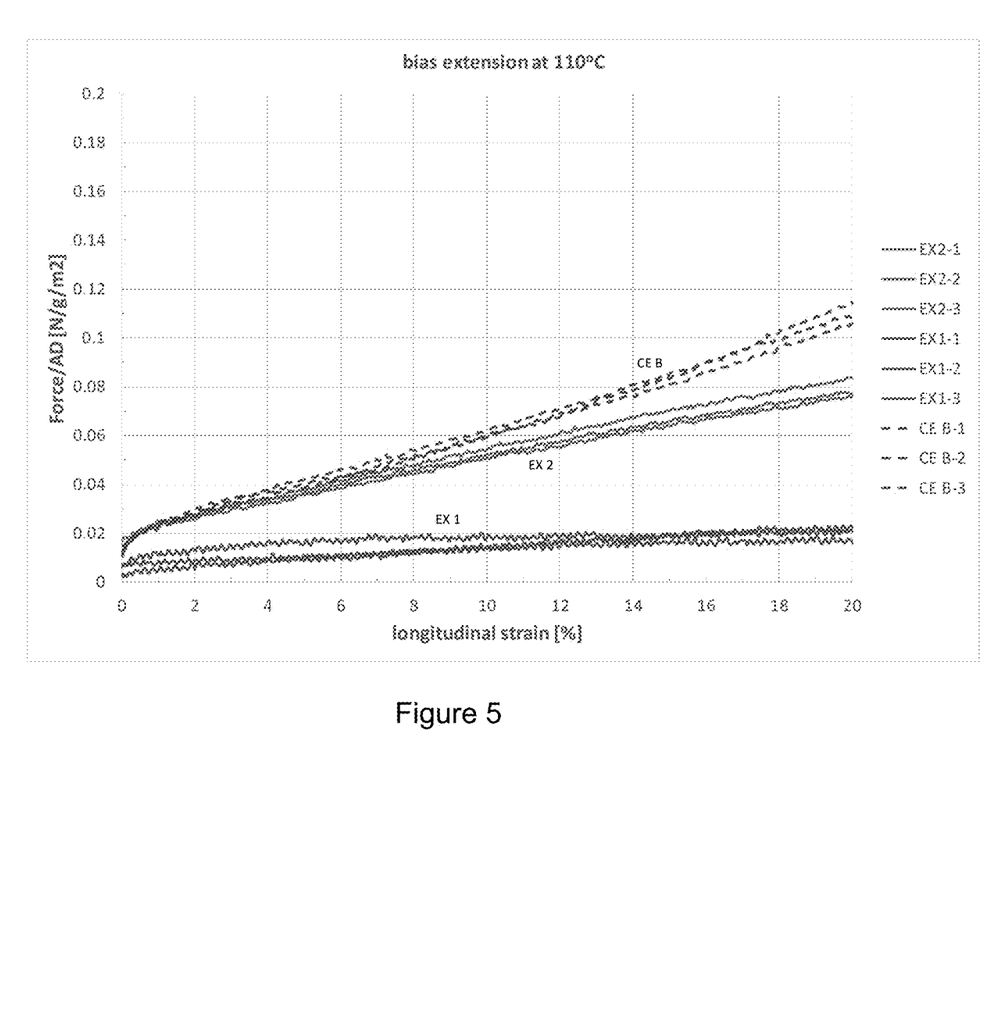
FIG. 5 is an overlay of bias extension test results measured at 110° C. temperature according to the above described method. The extensional force normalized to the areal density of the samples on the y-axis is plotted in N·m²·g⁻¹ against the longitudinal strain of the test sample in percent elongation. For each of the Examples (EX1 and EX2) and comparative Experiment (CE B) the plots for 3 individual samples (−1, −2 and −3) are shown.

Secant stiffness at 1% elongation in the bias extension test is determined in the plot shown in FIGS. 3 and 5 by calculating the slope of a line from the origin to the areal density normalized force at 1% elongation in length direction.

EXPERIMENTAL

Comparative Experiment A

Monolayers of polyethylene fibers were prepared according to the process as described in WO2005066401. Here for the multifilament yarn Dyneema® 880 SK99 (DSM, The Netherlands) having a titer of 880 dtex and a tenacity of 4.25 N/tex was used to make a uni-directional (UD) mono-layer by feeding the yarn from several packages from a creel, spreading the filaments, and impregnating the filaments with an aqueous dispersion of Kraton® D11 07 stryrene-isoprene-styrene blockcopolymer as matrix material having a modulus by DMTA of 0.9 MPa and <<0.01 MPa at 25° C. and 110° C. respectively. After drying the UD monolayer had an areal density of 34 g/m² and a matrix content of about 16 wt %. Four such unidirectional layers were cross plied in a 0° 90° 0° 90° sequence and consolidated for 30 seconds at a pressure of 30 bar and a temperature of 115° C. The resulting composite sheet, bare of further protective films, had an areal density of 136 g/m².

Comparative Experiment B

Comparative Experiment A was repeated with the difference that a commercially available polyurethane suspension in water was applied to the monolayers resulting in a composite sheet with a matrix level of about 17% and an areal density of about 138 g/m². The dried PUR has a modulus by DMTA of 55 MPa and 4.5 MPA at 25° C. and 110° C. respectively.

Example 1

Comparative Experiment A was repeated with the difference that a 28 wt % aqueous dispersion of an ethylene acrylic acid copolymer was used to impregnate the monolayers. The copolymer had an acrylic acid content of about 30 wt % and a melt flow index of >200 g/10 min (21.6 kg, 190° C.). The EAA copolymer had a melting peak at 78° C., a heat of fusion of 29 J/g, and a modulus by DMTA of 280 MPa and <<0.01 MPA at 25° C. and 110° C. respectively. A composite sheet with a matrix content of 15 wt % and an areal density of about 134 g/m² was obtained.

Example 2

Comparative Experiment A was repeated with the difference that a 25 wt % aqueous dispersion of a neutralized ethylene acrylic acid copolymer was used. The acrylic acid level of the copolymer was about 10 wt % whereby the neutralization of the carboxylic acid exceeded 98% and consisted of about 17 mol % ammonia and 83 mol % potassium counter ions. The melt flow index of the dried neutralized copolymer was 4.5 g/10 min (21.6 kg, 190° C.). The neutralized copolymer had a peak melting temperature at 85° C. a modulus by DMTA of 150 MPa and 0.7 MPA at 25° C. and 110° C. respectively. A composite sheet with a matrix content of about 13 wt % and an areal density of about 126 g/m² was obtained.

Rectangular samples (10 cm×30 cm) of all above composite sheets where cut with the fiber orientation in the −45/+45° direction of said rectangular samples. The samples were tested for in-plane shear properties according to ASTM D3518-94. The respective data are reported in Table 1.

Composite sheets (plies) of each of the examples and comparative experiments having a size of 100×100 cm² have been assembled to create stack with an areal density of about 15 kg/m². These stacks where put in a cold press and pressurized to 165 bar while being heated to 135° C. The core reached the set temperature of 135° C. after 30 minutes compression and was kept for further 5 minutes at 135° C. and 165 bar. The pressure was maintained during cooling until the core temperature reached 60° C. followed by removal of the compressed panel from the press.

The panels produced from the sheets of comparative experiments A and B both showed blisters on their surface upon removal from the press. The panels comprising the polyethylene resins according to the invention showed a homogeneous surface without any detectable inhomogeneity. Surface and bulk appearance of the panels made with sheets of example 1 and 2 did not change even after 24 h storage at room temperature.

The invention claimed is:

1. A composite sheet comprising:
   a matrix comprising an at least partially neutralized copolymer of ethylene further comprising monomeric units derived from at least one unsaturated carboxylic acid, wherein the at least partially neutralized copolymer of ethylene has a density as measured according to ISO1183 of between 870 to 980 kg/m³, and
   at least two adjacent fibrous monolayers of unidirectionally aligned high tenacity polyethylene fibers impregnated with the matrix, wherein a direction of orientation between the polyethylene fibers of the at least two fibrous layers differs by at least 80° and up to 90°, wherein the fibers have a tenacity of at least 1.5 N/tex, and wherein
   the composite sheet has an areal density of between 50 and 500 g/m² wherein the composite sheet has an areal density normalized in-plane shear force measured at 25° C. evaluated according to a bias extension test method variant of ASTM D3518 of at least 0.40 N·m²·g⁻¹ and lower than 5.0 N·m²·g⁻¹ at 10 mm clamp displacement and an areal density normalized in-plane shear force measured at 110° C. and clamp displacement of 10 mm of at least 0.03 N·m²·g⁻¹ and lower than 0.20 N·m²·g⁻¹.

2. The composite sheet according to claim 1, wherein the composite sheet has an areal density normalized in-plane shear secant stiffness at 1% longitudinal deformation of at least 30 N·m²·g⁻¹ and less than 200 N·m²·g⁻¹, the in-plane shear secant stiffness being measured at 25° C. according to the bias extension test.

3. The composite sheet according to claim 2₁ wherein the composite sheet has an areal density normalized in-plane shear secant stiffness at 1% longitudinal deformation of at

TABLE 1

| Example | Matrix | AD [g/m²] | Norm. force, 25° C. @ 10 mm displ. [N·m²·g⁻¹] | Norm. force, 110° C. @ 10 mm displ. [N·m²·g⁻¹] | Norm. Secant stiffness, 25° C. @ 1% deform. [N·m²·g⁻¹] | Norm. Secant stiffness, 110° C. @ 1% deform. [N·m²·g⁻¹] |
|---|---|---|---|---|---|---|
| CE A | SEBS | 136 | 0.17 | — | 9 | — |
| CE B | PUR | 138 | 0.19 | 0.054 | 10 | 2.31 |
| Ex 1 | EAA | 134 | 0.86 | 0.014 | 49 | 0.87 |
| Ex 2 | k/NH₄⁺-ionomer | 126 | 1.15 | 0.048 | 72 | 2.34 | least 1.0 N·m$^2$·g$^{-1}$ and less than 7.0 N·m$^2$·g$^{-1}$, the in-plane shear secant stiffness being measured at 110° C. according to the bias extension test.

4. The composite sheet of claim 1, comprising from 2 to 25 wt % of the at least partially neutralized copolymer of ethylene, based on the total weight of the composite sheet.

5. The composite sheet of claim 4, wherein the at least partially neutralized copolymer of ethylene comprises at least 90 mol % of monomeric units derived from ethylene.

6. The composite sheet of claim 4, wherein the at least partially neutralized copolymer of ethylene is an ethylene acrylic acid (EAA) copolymer, an ethylene methacrylic acid (EMA) copolymer or mixtures thereof.

7. The composite sheet of claim 4, wherein the carboxylic acid comprises as neutralizing ion a cation selected from the group consisting of Na$^+$, K$^+$, Li$^+$, Ag$^+$, Cu$^+$, Cu$^{2+}$, Be$^+$, Mg$^{2+}$, Ca$^{2+}$, Sn$^{2+}$, Sn$^{4+}$, Fe$^{2+}$, Fe$^{3+}$, Zn$^{2+}$, Al$^{3+}$, NH$^{4+}$ and combinations thereof.

8. The composite sheet of claim 7, wherein the carboxylic acid comprises between 1.0 and 30 mol % of NH$_4^+$ as the neutralizing ion.

9. The composite sheet of claim 7, wherein between 70 and 99.9 mol % of the neutralizing ion is selected from the group consisting of Na$^+$, K$^+$, Li$^+$, Mg$^{2+}$, Ca$^{2+}$, Sn$^{2+}$, Zn$^{2+}$, Al$^{3+}$ and mixtures thereof.

10. The composite sheet of claim 4, wherein the carboxylic acid groups of the at least partially neutralized copolymer of ethylene have a degree of neutralization which is between 50 and 100 mol %.

11. The composite sheet of claim 1, wherein the at least partially neutralized copolymer of ethylene has a melt flow index of between 0.5 and 50 g/10 min when measured according to ASTM 1238B-13 at a temperature of 190° C. and a weight of 21.6 kg.

12. The composite sheet according to claim 1, wherein the at least partially neutralized copolymer of ethylene has a modulus at 25° C. of between 50 MPa and 500 MPa and a modulus at 110° C. of between 0.1 and 10 MPa.

13. A ballistic resistant article comprising at least one composite sheet as defined in claim 1.

14. The ballistic resistant article of claim 13, wherein the article is a compression molded panel which comprises at least 10 of the composite sheets.

* * * * *